United States Patent
Wagner et al.

(10) Patent No.: US 10,086,519 B2
(45) Date of Patent: Oct. 2, 2018

(54) EVERTING END EFFECTOR FOR USE WITH AN ARTICULATED ARM IN A ROBOTIC SYSTEM

(71) Applicant: Berkshire Grey Inc., Waltham, MA (US)

(72) Inventors: Thomas Wagner, Concord, MA (US); Kevin Ahearn, Camden, SC (US); Michael Dawson-Haggerty, Pittsburgh, PA (US); Christopher Geyer, Arlington, MA (US); Thomas Koletschka, Cambridge, MA (US); Kyle Maroney, North Attleboro, MA (US); Matthew T. Mason, Pittsburgh, PA (US); Gene Temple Price, Somerville, MA (US); Joseph Romano, Somerville, MA (US); Daniel Smith, Pittsburgh, PA (US); Siddhartha Srinivasa, Pittsburgh, PA (US); Prasanna Velagapudi, Pittsburgh, PA (US); Thomas Allen, Reading, MA (US)

(73) Assignee: Berkshire Grey, Inc., Lexington, MA (US)

( * ) Notice: Subject to any disclaimer, the term of this patent is extended or adjusted under 35 U.S.C. 154(b) by 0 days.

(21) Appl. No.: 15/266,594

(22) Filed: Sep. 15, 2016

(65) Prior Publication Data

US 2017/0072572 A1    Mar. 16, 2017

Related U.S. Application Data

(60) Provisional application No. 62/218,799, filed on Sep. 15, 2015.

(51) Int. Cl.
*B25J 15/06* (2006.01)
*B25J 18/00* (2006.01)
(Continued)

(52) U.S. Cl.
CPC ....... *B25J 15/0616* (2013.01); *B25J 15/0023* (2013.01); *B25J 15/065* (2013.01);
(Continued)

(58) Field of Classification Search
CPC .. B25J 15/0616; B25J 15/065; B25J 15/0658; B25J 15/0004; B25J 15/0023;
(Continued)

(56) References Cited

U.S. PATENT DOCUMENTS 4,469,100 A * 9/1984 Hardwick ........ A61B 17/22032
                                                    604/908
4,561,686 A   12/1985 Atchley
(Continued)

FOREIGN PATENT DOCUMENTS

DE        3810989 A1    8/1989
DE   102005018207 A1   10/2006
(Continued)

OTHER PUBLICATIONS

International Search Report and the Written Opinion issued by the International Searching Authority dated Dec. 9, 2016 in related International Application No. PCT/US2016/051922.

*Primary Examiner* — Dean J Kramer
(74) *Attorney, Agent, or Firm* — Gesmer Updegrove LLP

(57) ABSTRACT

An end effector for an articulated arm in a robotic system includes an enclosed flexible membrane generally in the form of a tubular annulus that contains a fluid within the membrane. The tubular annulus includes a distal end for engaging objects; and a linear actuator that is positioned for reciprocal movement within the tubular annulus. The linear actuator provides actuation of the tubular annulus to grasp an object and the linear actuator provides a vacuum source at a distal end of the linear actuator. The linear actuator is also selectively coupled to a source of positive air pressure
(Continued)

for providing positive air pressure to an object-retaining area.

36 Claims, 5 Drawing Sheets

(51) Int. Cl.
    *B25J 15/00*     (2006.01)
    *B65G 47/90*     (2006.01)

(52) U.S. Cl.
    CPC ............ *B25J 18/00* (2013.01); *B65G 47/908* (2013.01); *Y10S 901/40* (2013.01)

(58) Field of Classification Search
    CPC ...... B25J 18/00; B65G 47/908; Y10S 901/40; Y10S 294/902
    USPC .................................................. 294/86.4, 185
    See application file for complete search history.

(56) References Cited

U.S. PATENT DOCUMENTS

| | | |
|---|---|---|
| 5,752,729 A | 5/1998 | Crozier et al. |
| 5,865,487 A | 2/1999 | Gore et al. |
| 6,846,029 B1 | 1/2005 | Ragner et al. |
| 6,944,387 B2 | 9/2005 | Howell et al. |
| 7,726,716 B2 * | 6/2010 | Shuttleworth ........ E01H 1/1206 294/86.4 |
| 7,785,422 B2 * | 8/2010 | Autumn ................ B08B 7/0028 134/32 |
| 8,132,835 B2 | 3/2012 | Ban et al. |
| 8,267,386 B2 | 9/2012 | Schaaf et al. |
| 8,548,626 B2 | 10/2013 | Steltz et al. |
| 8,662,861 B2 | 3/2014 | Tell |
| 9,623,570 B1 * | 4/2017 | Krahn .................. B25J 15/0023 |
| 2003/0038491 A1 | 2/2003 | Schmalz et al. |
| 2003/0160470 A1 * | 8/2003 | Marshall .................. B25B 9/00 294/86.4 |
| 2004/0169386 A1 | 9/2004 | Shuttleworth |
| 2004/0232716 A1 * | 11/2004 | Reed ....................... B25J 15/00 294/86.4 |
| 2014/0005831 A1 | 1/2014 | Naderer et al. |

FOREIGN PATENT DOCUMENTS

| | | |
|---|---|---|
| DE | 102012009011 A1 | 12/2012 |
| JP | 2010-201536 A | 9/2010 |
| WO | 2014161549 A1 | 10/2014 |

\* cited by examiner

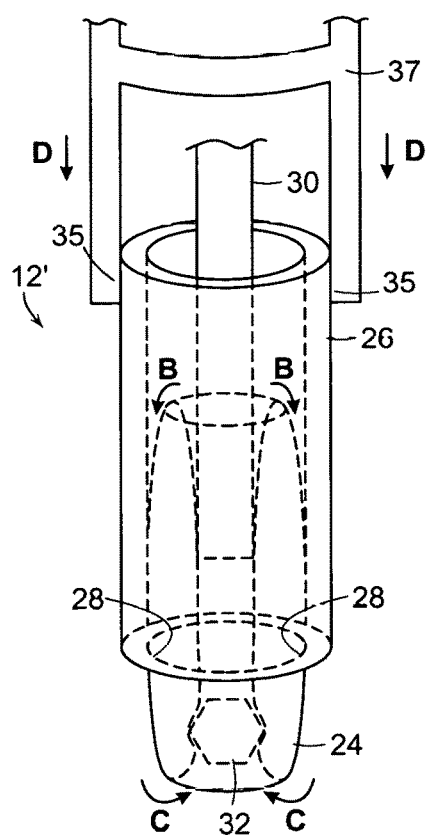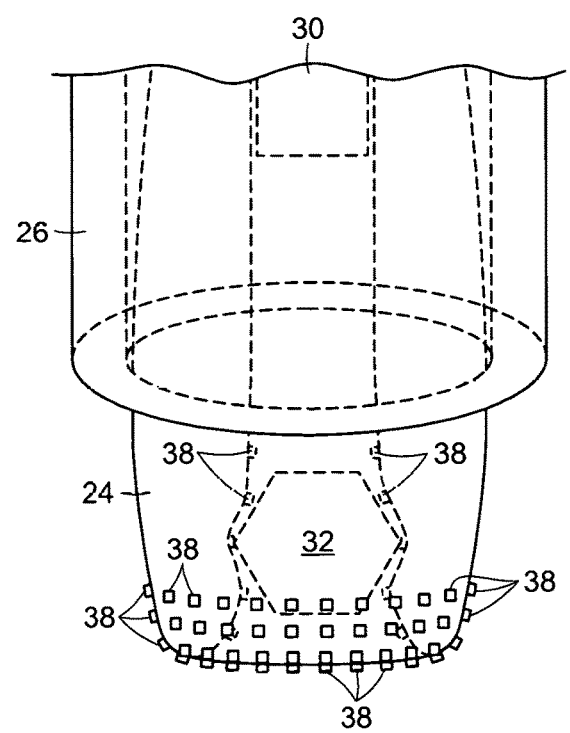
FIG. 3
FIG. 4A

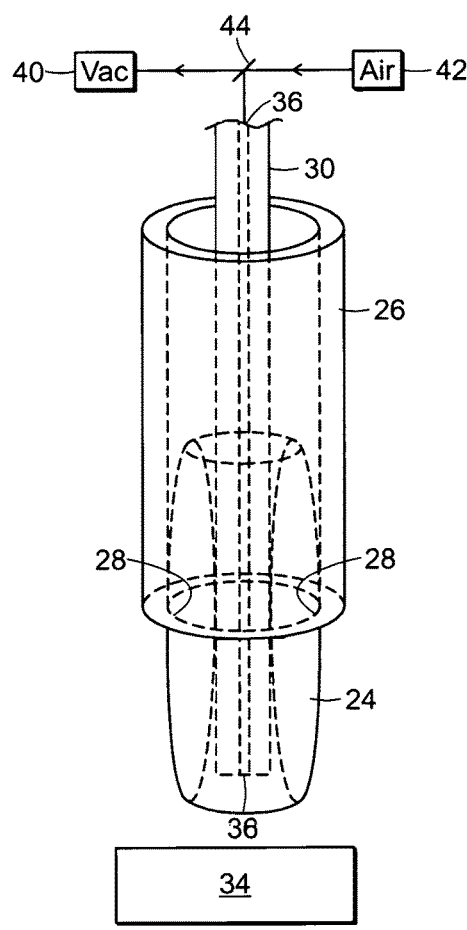
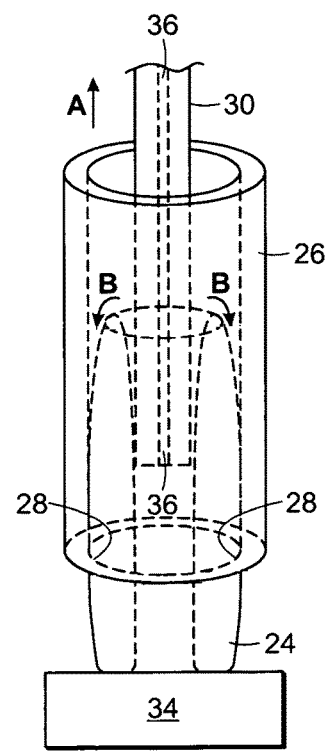
FIG. 5A
FIG. 5B

EVERTING END EFFECTOR FOR USE WITH AN ARTICULATED ARM IN A ROBOTIC SYSTEM

PRIORITY

The present application claims priority to U.S. Provisional Patent Application Ser. No. 62/218,799 filed Sep. 15, 2015, the disclosure of which is hereby incorporated by reference in its entirety.

BACKGROUND

The invention generally relates to robotic systems, and relates in particular to robotic systems that include articulated arms with end effectors for securing objects to the articulated arms in such a manner that they can be easily released by the end effector.

There are numerous end effectors (or grippers) commonly employed for industrial automation and other applications, including vacuum grippers, parallel jaw grippers, angular jaw grippers, and many others.

Vacuum grippers typically employ vacuum sources to evacuate a vacuum cup which is pressed onto a hard smooth surface to obtain a good seal. Gripping soft surfaces such as bagged products is more challenging, but in some instances a bag gripper may obtain a good seal with a plastic bag in order to lift it.

Parallel jaw and angular jaw grippers are sometimes used in industrial processes. Besides lifting and moving parts, they may be used to move a part to a precise location for high-tolerance mechanical assembly operations.

Magnetic grippers are also commonly employed, when a ferrous material is involved. In addition, there are many special purpose grippers suited to particular applications, such as internal chuck collets to grasp gears and wheels, or arrays of needles to grasp sheets of cloth.

A class of soft grippers has also been developed in research labs, and one example is the "Jamming Gripper" developed by a consortium that includes iRobot, Cornell University, and Empire Robotics. The Jamming Gripper includes a granular material enclosed in a soft bag, that conforms to an object shape and then stiffens when the air is evacuated from the bag.

A similar product is the Festo FlexShapeGripper sold by Festo Corporation that employs eversion of a flexible membrane to grasp an object. Such a system however, may not be suitable for certain applications, such as grasping a wide variety of packaging materials.

There remains a need, therefore, for an end effector that more is versatile enough to be used on a wide variety of objects.

SUMMARY

In accordance with an embodiment, the invention provides an end effector for an articulated arm in a robotic system. The end effector includes an enclosed flexible membrane generally in the form of an annulus that contains a fluid within the membrane.

In accordance with another embodiment, the invention provides a method of engaging an object by an articulated arm of a robotic system. The method includes the steps of positioning near an object to be engaged, an enclosed flexible membrane that contains a fluid and is generally in the form of an annulus, and engaging the object with the enclosed flexible membrane.

In accordance with a further embodiment, the invention provides an end effector for an articulated arm in a robotic system. The end effector includes a tubular annulus, wherein objects may be grasped by an inside of the tubular annulus.

BRIEF DESCRIPTION OF THE DRAWINGS

The following description may be further understood with reference to the accompanying drawings in which:

FIG. 3 shows an illustrative diagrammatic view of an end effector in accordance with another embodiment of the present invention involving an outer sleeve actuator;

FIGS. 4A-4C show illustrative diagrammatic views of end effector in accordance with further embodiments of the present invention involving gripping elements on an exposed surface of the tubular annulus;

FIGS. 5A and 5B show illustrative diagrammatic views of the end effector in accordance with a further embodiment of the present invention that includes a vacuum source in an initial position (FIG. 5A) and in an engaged position (FIG. 5B) with respect to an object.

The drawings are shown for illustrative purposes only.

DETAILED DESCRIPTION

In accordance with an embodiment, the invention provides an enveloping gripper that grips a broad range of shapes and materials via compression and eversion of a compliant material structure in contact with the object to be grasped. In certain embodiments, the system additionally provides a vacuum source to prime the grasping process. The system employs compression and eversion of the compliant fabric to entrap and grasp soft objects as well as a wide range of hard objects in various embodiments.

Typical gripper solutions work by squeezing an object between stiff mechanical links. The present invention employs a different principle whereby a flexible membrane is compressed and everted as it is drawn into the center of the supporting structure. In accordance with an embodiment, the system employs a fluid-filled flexible fabric material that is generally in the form of an annulus, and in an embodiment, is in the form of a tubular annulus (and may also be referred to as a toroidal fabric). Such a device is formed of a continuous sheet of fabric that is in the form of an annulus that extends along the direction that extends through the center of the annulus. Applicants have described this herein as a tubular annulus. The tubular annulus contains a fluid, and as the outer surface is moved in a first direction, the inner surface moves in an opposite direction.

Figure 1:
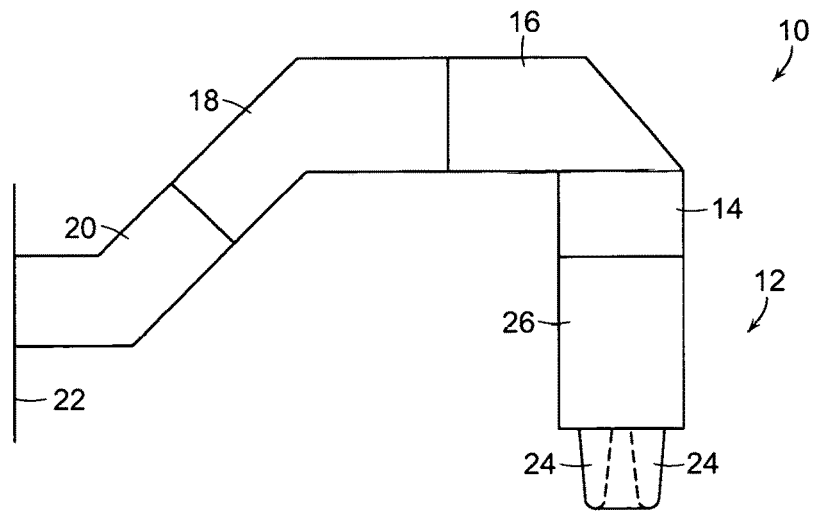
FIG. 1 shows an illustrative diagrammatic view of a robotic system that includes an end effector in accordance with an embodiment of the present invention.

In accordance with certain embodiments, an articulated arm 10 of the present invention may include an end effector 12 as well as articulated sections 14, 16, 18 and 20, the last of which is attached to a base 22 as shown in FIG. 1. The end effector 12 includes a tubular annulus 24 that extends from an outer collar 26.

Figures 2A, 2B:
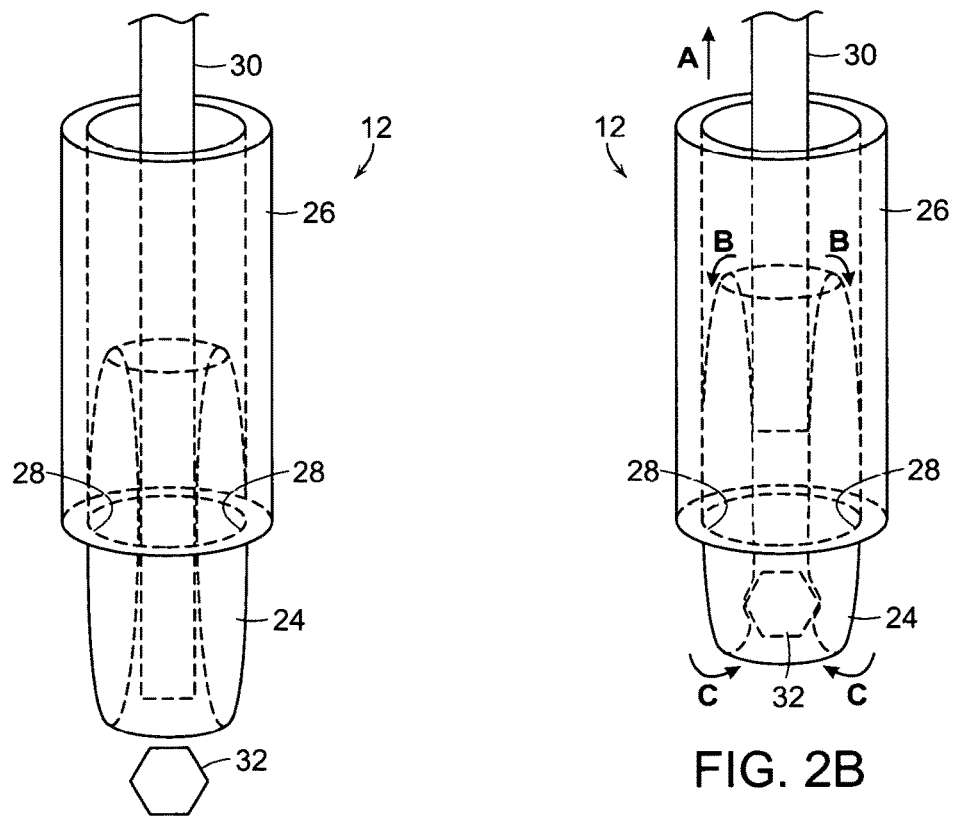
FIGS. 2A and 2B show illustrative diagrammatic views of the end effector of FIG. 1 in an initial position (FIG. 2A) and in an engaged position (FIG. 2B) with respect to an object.

As shown in FIG. 2A, which shows the area within the outer collar 26 in dashed lines, a portion of the outer surface of the tubular annulus 24 is attached to the inner surface of the outer collar 26 as shown at 28. Because the inner surface of the tubular annulus 24 is free to move, the tubular annulus is thus able to move up and down (by rolling) within the outer collar while the point of attachment 28 remains fixed. To facilitate this rolling within the outer collar, a linear actuator (such as an actuation rod) 30 is positioned within the inner surface of the tubular annulus 24.

As further shown in FIG. 2B, when the rod 30 is moved in the direction as indicated at A, it draws the inner surface of the tubular annulus with it, which causes one end of the tubular annulus to roll upon itself in directions as indicated at B, while the opposing end of the tubular annuls will roll upon itself in directions as indicated at C. While the tubular annulus 24 undergoes this process of everting, it remains attached to the outer collar 26 at the attachment 28. By controlling the movement of the tubular annulus as described above, the end effector may be used to draw an object 32 into the tubular annulus and hold it within the tubular annulus until the linear actuator is moved in a direction that is opposite the direction indicated at A (and the object 32 is discharged). As also shown in FIG. 2B, the tubular annulus is formed of a flexible material that may conform to the shape of the object 32 being grasped. The fluid within the tubular annulus may be water or may be selected to have a particular viscosity.

FIG. 3 shows another embodiment of the invention similar to the embodiment of FIGS. 2A and 2B, except that the outer collar 26 is moved relative the rod 30. In particular, the outer collar 26 is attached (as shown at 35) to a collar actuator 37. When the collar actuator 37 is moved in a direction shown at D with respect to the rod 30, the inner surface of the collar 26 will cause the tubular annulus 24 to roll (as shown at B and C) such that the object 32 may be grasped within the tubular annulus 24.

Figure 4C:
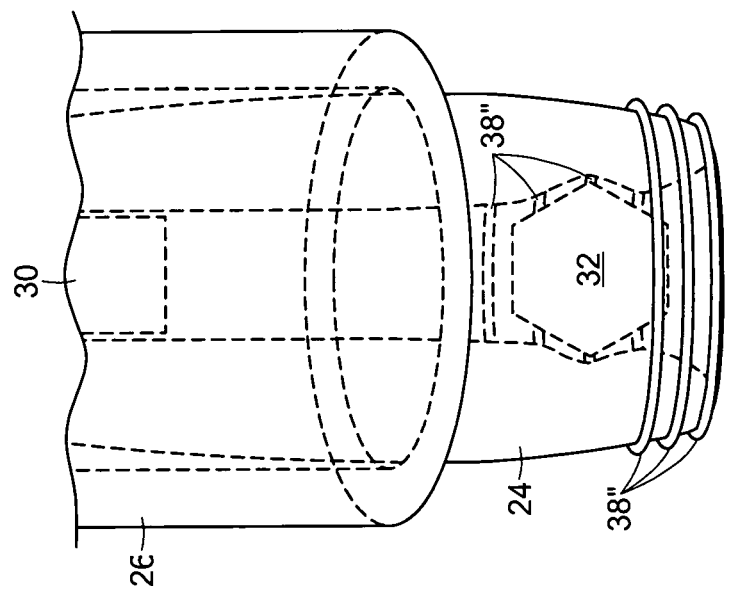
Figure 4B:
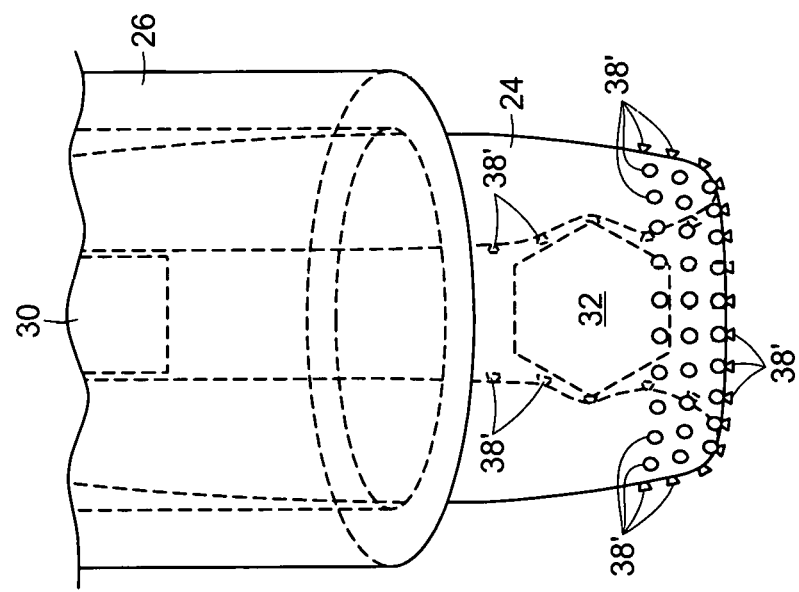

FIG. 4A shows a further embodiment of the present invention in which the tubular annulus 24 includes gripping elements 38 that are provided on the outer surface of the tubular annulus 24. As the tubular annulus 24 draws the object 32 into the tubular annulus, the gripping elements 38 on the tubular annulus facilitate the capture and retention of the object 32. In accordance with various embodiments, and with reference to FIG. 4A, the gripping elements may be raised lands that may be either ordered or randomly distributed on the outer surface of the tubular annulus 24. As shown in FIG. 4B, in accordance with another embodiment, the gripping elements may be small flexible cups (suction cups) 38', and as shown in FIG. 4C, the gripping elements may be in the form of cleats 38". In any of these embodiments, the gripping elements may also include magnets to further facilitate gripping any ferromagnetic packaging on objects.

FIGS. 5A and 5B show an end effector similar to that shown in FIGS. 2A and 2B wherein an object 34 that is larger than the opening within the tubular annulus is nonetheless grasped by the tubular annulus 24. This is achieved by drawing the tubular annulus away from a smooth surface of the object 34. Further, in the embodiment of the FIGS. 5A and 5B, the linear actuator may include an aperture 36 there-through that is coupled to a vacuum source 40 and further optionally to a positive air source 42 via a switch 44 to provide an ejection of the object. The vacuum source 40 may facilitate providing a vacuum in the area within the tubular annulus between the linear actuator 30 and the object 34 being grasped. The positive air pressure may be selectively employed to eject the object 34 when released.

Figures 6A, 6B:
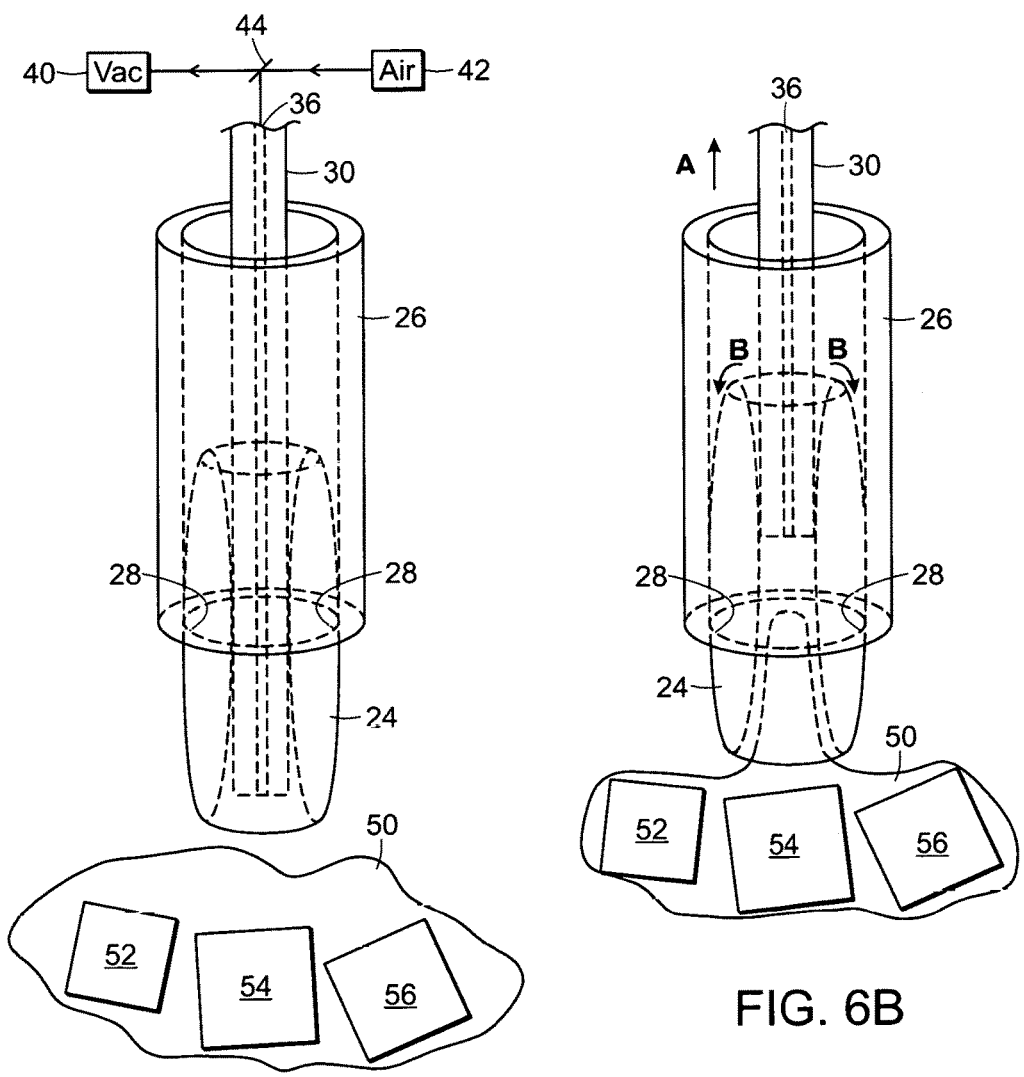
FIGS. 6A and 6B show illustrative diagrammatic views of the end effector in accordance with a further embodiment of the present invention that includes a vacuum source in an initial position (FIG. 6A) and in an engaged position (FIG. 6B) with respect to an object that is a bag of item.

In accordance with further embodiments, systems of the invention may be employed to grasp an object that is an item or a set of items in a plastic bag. Fabrics and bags are particularly difficult to grasp by other means, but may be grasped in accordance with certain embodiments of the present invention. FIGS. 6A and 6B show the system shown in FIGS. 5A and 5B wherein the object 50 is a bag of containing items 52, 54 and 56 is grasped by drawing a portion of the bag up into the tubular annulus as shown in FIG. 6B. This process is facilitated by compression wrinkles that form naturally in the fabric, and may be augmented by using a vacuum source 40 to facilitate the grasping of the bag 50, as well as any of the gripping elements discussed above.

In particular, and in accordance with these embodiments, there are two mechanisms that address a potential problem of the fabric of the bag not being initially drawn into the cavity. First, as mentioned, it is possible to introduce a vacuum, attached to the bottom of the actuator link, that primes the grasp by drawing the object fabric into the cavity. Second, when the annulus material is drawn towards the center, compression wrinkles form in the annulus material, and this may induce compression wrinkles in the object fabric, intimately intermingling the fabrics so that friction assists in drawing the object fabric into the cavity.

Those skilled in the art will appreciate that numerous modifications and variations may be made to the above disclosed embodiments without departing from the spirit and scope of the present invention.

What is claimed is:

1. An end effector for an articulated arm in a robotic system, said end effector comprising:

an enclosed flexible membrane generally in the form of a tubular annulus that contains a fluid within the membrane, wherein the tubular annulus includes a distal end for engaging objects; and a linear actuator that is positioned for reciprocal movement within the tubular annulus, said linear actuator providing actuation of the tubular annulus to grasp an object and said linear actuator providing a vacuum source at a distal end of the linear actuator, which distal end of the linear actuator is within a central region of the tubular annulus such that a vacuum is provided within an object-retaining area defined by the distal end of the linear actuator, the inner walls of the tubular annulus, and the distal end of the tubular annulus, wherein the fluid is water, wherein said tubular annulus is attached on an outer surface thereof to an outer collar that is attached to the articulated arm, and wherein said linear actuator is selectively coupled to a source of positive air pressure for providing positive air pressure to the object-retaining area.

2. The end effector as claimed in claim 1, wherein the distal end of the linear actuator is attached to the tubular annulus.

3. The end effector as claimed in claim 1, wherein the end effector includes a switch for switching between coupling the object-retaining area to one of a vacuum source for providing the vacuum within the tubular annulus, and to the source of positive air pressure for providing the positive air pressure to the object retaining area.

4. The end effector as claimed in claim 1, wherein the vacuum is provided through the linear actuator that is positioned for reciprocal movement within the tubular annulus, and wherein the object-retaining area permits a flexible bag to be engaged within the tubular annulus.

5. The end effector as claimed in claim 4, wherein the positive air pressure is selectively provided within the tubular annulus to urge the flexible bag to move away from the end effector.

6. A method of engaging an object by an articulated arm of a robotic system, said method comprising the steps of:
positioning near an object to be engaged, an enclosed flexible membrane that contains a fluid and is generally in the form of a tubular annulus;
engaging the object with the enclosed flexible membrane;
moving a linear actuator within the tubular annulus such that a distal end portion of the linear actuator is drawn within the tubular annulus;
drawing the object within the tubular annulus into an object-retaining area;
providing a vacuum through the linear actuator such that a vacuum is created in the object-retaining area between the distal end of the linear actuator and inner walls of the tubular annulus; and
providing a positive air pressure within the tubular annulus when a vacuum is not provided through the linear actuator.

7. The method as claimed in claim 6, wherein said fluid is water.

8. The method as claimed in claim 6, wherein said distal end of the tubular annulus includes gripping elements.

9. The method as claimed in claim 8, wherein the method further includes the step of moving the linear actuator within the tubular annulus during application of the vacuum to the object-retaining area.

10. The method as claimed in claim 6, wherein the method further includes the step of switching between providing the vacuum within the tubular annulus to assist in grasping or maintaining the object, and providing the positive air pressure within the tubular annulus to urge the object to move away from the tubular annulus.

11. An end effector for an articulated arm in a robotic system, said end effector comprising a tubular annulus, wherein objects may be grasped by an inside of the tubular annulus; and a switch for switching between providing a vacuum within a central opening of the tubular annulus, and a positive air pressure within the central opening of the tubular annulus.

12. The end effector as claimed in claim 11, wherein the tubular annulus includes gripping elements on an outer surface of the tubular annulus.

13. The end effector as claimed in claim 12, wherein the gripping elements include lands.

14. The end effector as claimed in claim 12, wherein the gripping elements include flexible cups.

15. The end effector as claimed in claim 12, wherein the gripping elements include cleats.

16. An end effector for an articulated arm in a robotic system, said end effector comprising:
an enclosed flexible membrane generally in the form of a tubular annulus that contains a fluid within the membrane, wherein the tubular annulus includes a distal end for engaging objects; and
a linear actuator that is positioned for reciprocal movement within the tubular annulus, said linear actuator providing actuation of the tubular annulus to grasp an object and said linear actuator providing a vacuum source at a distal end of the linear actuator, which distal end of the linear actuator is within a central region of the tubular annulus such that a vacuum is provided within an object-retaining area defined by the distal end of the linear actuator, the inner walls of the tubular annulus, and the distal end of the tubular annulus, wherein the distal end of the linear actuator is attached to the tubular annulus, and wherein the end effector includes a switch for switching between coupling the object-retaining area to one of a vacuum source for providing the vacuum within the tubular annulus, and to a source of positive air pressure for providing a positive air pressure to the object retaining area.

17. The end effector as claimed in claim 16, wherein a portion of the enclosed flexible membrane is attached to the articulated arm.

18. The end effector as claimed in claim 16, wherein said fluid is water.

19. The end effector as claimed in claim 18, wherein said tubular annulus is attached on an outer surface thereof to an outer collar that is attached to the articulated arm.

20. The end effector as claimed in claim 19, wherein the distal end of the tubular annulus includes gripping elements.

21. The end effector as claimed in claim 19, wherein the positive air pressure for providing positive air pressure to the object-retaining area is provided through the linear actuator.

22. The end effector as claimed in claim 16, wherein the vacuum is provided through the linear actuator that is positioned for reciprocal movement within the tubular annulus, and wherein the object-retaining area permits a flexible bag to be engaged within the tubular annulus.

23. The end effector as claimed in claim 22, wherein the positive air pressure within the tubular annulus is sufficient to urge the flexible bag to move away from the end effector.

24. An end effector for an articulated arm in a robotic system, said end effector comprising:
an enclosed flexible membrane generally in the form of a tubular annulus that contains a fluid within the membrane, wherein the tubular annulus includes a distal end for engaging objects; and
a linear actuator that is positioned for reciprocal movement within the tubular annulus, said linear actuator providing actuation of the tubular annulus to grasp an object and said linear actuator providing a vacuum source at a distal end of the linear actuator, which distal end of the linear actuator is within a central region of the tubular annulus such that a vacuum is provided within an object-retaining area defined by the distal end of the linear actuator, the inner walls of the tubular annulus, and the distal end of the tubular annulus, wherein the vacuum is provided through the linear actuator that is positioned for reciprocal movement within the tubular annulus, wherein the object-retaining area permits a flexible bag to be engaged within the tubular annulus, and wherein the end effector further includes a positive air pressure source for selectively providing a positive air pressure within the tubular annulus to urge the flexible bag to move away from the end effector.

25. The end effector as claimed in claim 24, wherein a portion of the enclosed flexible membrane is attached to the articulated arm.

26. The end effector as claimed in claim 24, wherein said fluid is water.

27. The end effector as claimed in claim 26, wherein said tubular annulus is attached on an outer surface thereof to an outer collar that is attached to the articulated arm.

28. The end effector as claimed in claim 27, wherein the distal end of the tubular annulus includes gripping elements.

29. The end effector as claimed in claim 27, wherein the linear actuator is selectively coupled to a source of positive air pressure for providing positive air pressure to the object-retaining area.

30. The end effector as claimed in claim 24, wherein the distal end of the linear actuator is attached to the tubular annulus.

31. The end effector as claimed in claim 30, wherein the end effector includes a switch for switching between coupling the object-retaining area to one of a vacuum source for providing the vacuum within the tubular annulus, and to the source of positive air pressure for providing the positive air pressure to the object retaining area.

32. A method of engaging an object by an articulated arm of a robotic system, said method comprising the steps of:
positioning near an object to be engaged, an enclosed flexible membrane that contains a fluid and is generally in the form of a tubular annulus;
engaging the object with the enclosed flexible membrane;
moving a linear actuator within the tubular annulus such that a distal end portion of the linear actuator is drawn within the tubular annulus;
drawing the object within the tubular annulus into an object-retaining area;
providing communication with a vacuum source through the linear actuator such that a vacuum is created in the object-retaining area between the distal end of the linear actuator and inner walls of the tubular annulus; and
switching between providing the vacuum within the tubular annulus to assist in grasping or maintaining the object, and providing positive air pressure within the tubular annulus to urge the object to move away from the tubular annulus.

33. The method as claimed in claim 32, wherein said fluid is water.

34. The method as claimed in claim 32, wherein the tubular annulus includes a distal end for engaging objects, said distal end including gripping elements.

35. The method as claimed in claim 34, wherein the method further includes the step of moving the linear actuator within the tubular annulus during application of the vacuum to the object-retaining area.

36. The method as claimed in claim 32, wherein the method further includes the step of alternately providing the positive air pressure within the tubular annulus.

* * * * *